United States Patent [19]
Aston

[11] Patent Number: 5,479,710
[45] Date of Patent: Jan. 2, 1996

[54] NUT SPLITTERS

[75] Inventor: Peter R. Aston, Walsall, England

[73] Assignee: Hydra-Tight Limited, England

[21] Appl. No.: 157,016

[22] PCT Filed: Jun. 15, 1992

[86] PCT No.: PCT/GB92/01066

§ 371 Date: Nov. 30, 1993

§ 102(e) Date: Nov. 30, 1993

[87] PCT Pub. No.: WO93/00193

PCT Pub. Date: Jan. 7, 1993

[30] Foreign Application Priority Data

Jun. 28, 1991 [GB] United Kingdom ............... 9113991

[51] Int. Cl.⁶ .................................................. B26B 17/00
[52] U.S. Cl. ............................ 30/182; 30/175; 30/357
[58] Field of Search ........................... 30/180, 167, 168, 30/357, 175, 177, 182; 7/142; 29/256, 259

[56] References Cited

U.S. PATENT DOCUMENTS

| 3,258,295 | 6/1966 | Ives et al. ........................... 30/168 X |
| 3,495,330 | 2/1970 | Bruce ..................................... 30/180 |
| 3,992,777 | 11/1976 | Perkins et al. ......................... 30/180 |
| 4,044,465 | 8/1977 | Shuji ...................................... 30/180 |
| 4,257,163 | 3/1981 | Bauer .................................... 30/180 |
| 4,285,126 | 8/1981 | Irwin ...................................... 30/180 |
| 4,290,199 | 9/1981 | Hashimoto ............................. 30/180 |
| 4,549,324 | 10/1985 | Liou .................................. 30/168 X |
| 4,688,856 | 8/1987 | Elfgen ............................... 30/168 X |
| 4,698,909 | 10/1987 | Sleigh .................................... 30/180 |
| 4,875,289 | 10/1989 | Poling .................................... 30/167 |
| 5,070,616 | 12/1991 | Chen ................................. 30/180 X |

FOREIGN PATENT DOCUMENTS

| 1148432 | 4/1969 | United Kingdom . |
| 1601772 | 11/1981 | United Kingdom . |
| 2199528A | 7/1988 | United Kingdom . |
| 2215254 | 9/1989 | United Kingdom . |

Primary Examiner—Rinaldi I. Rada
Attorney, Agent, or Firm—Nixon & Vanderhye

[57] ABSTRACT

A nut splitter (FIG. 1) incorporates a cutter blade (11), the working edge (16) (FIG. 4) of which is of a blunt, rounded profile. The blade (11) is preferably an equilateral triangle in section, with a cutting edge (16) formed at each apex, thereby enabling use of a blade holder (10) which allows easy change of the working edge (16).

8 Claims, 2 Drawing Sheets

NUT SPLITTERS

This invention relates to apparatus for dismantling bolted connections and in particular to apparatus for removing a nut from such a connection.

BACKGROUND

It is sometimes extremely difficult to remove a nut by conventional means, especially after prolonged exposure to a corrosive environment, for example seawater. Whilst there are power driven tools such as hydraulic wrenches, it is often easier to simply cut the nut away or burn through it with a blow torch. Both of these methods have their own problems and/or risks, so relatively simple tools for splitting nuts have been developed.

A known nut splitter comprises a nut-encircling frame, or clamp which supports a cutting blade and means for forcing the blade into the side face of the nut to split it apart.

Common problems with existing nut splitters include the need for frequent blade replacement due to wear and tear, but more especially due to actual damage which is not repairable by re-grinding/sharpening. When as often happens the blade tip breaks off, a new blade is essential.

SUMMARY OF THE INVENTION

It is an object of the present invention to improve the performance of a conventional nut splitter.

According to the present invention, a nut splitter comprises a nut-encircling frame, a blade supported by and displaceable relative to said frame together with means for effecting said relative movement in a direction to split a nut within said frame, the cutting edge of said blade being formed with a blunt, rounded cross-section at said edge.

The blade is preferably triangular in cross-section, with an included angle at the cutting edge of from 40°–60°. The blunted tip preferably has a radius of from 0.5 to 2.5 mm. It is also preferred that the distal ends of the cutting edge are also rounded, the exact degree of rounding being not particularly critical.

According to a further aspect of the invention the blade is symmetrical in cross-section, each of the three apices of the resultant equilateral triangle being formed as a cutting edge of the kind just set forth. By this means, a single blade can be provided with three working edges instead of the one previously available. In the event of damage the blade need only be rotated through 120° in order to present a different working edge for use. Advantageously the nut splitter further incorporates a blade holder adapted to removably receive a blade having the cross-section of an equilateral triangle, thereby facilitating changing the working edge as necessary. The blade holder preferably includes means for retaining the blade. In practice a spring loaded ball detent is satisfactory for this, although other easily releasable means such as spring clips may be employed.

Surprisingly it has been found that the blunt, rounded edge profile of this invention is more efficient and considerably less vulnerable to damage than a conventional blade edge used for nut splitting. To illustrate this, the durability of a conventional, relatively sharp blade was compared with that of a blade with an edge according to this invention. Almost regardless of the metal used, the relatively sharp blade proved very liable to damage, including fracture of some or all of the cutting edge. Failure occurred after splitting only a very small number of nuts, in some cases only a single nut. By contrast, the cutting edge of the present invention proved to be almost indestructible.

In order that the invention be better understood a preferred embodiment of it will now be described by way of example with reference to the accompanying drawings.

DETAILED DESCRIPTION OF THE DRAWINGS

Figure 1A:
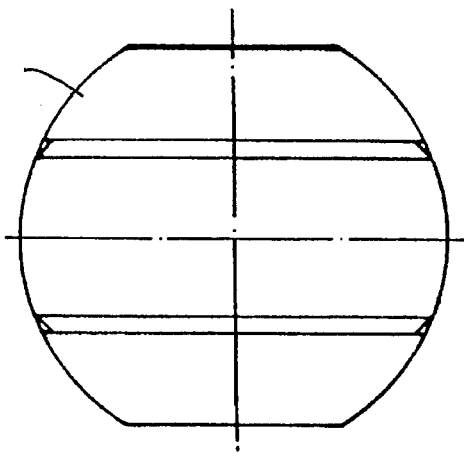
FIG. 1A is a right side view of the nut splitter shown in FIG. 1.

In the interests of simplicity, like parts in all Figures employ the same reference numerals.

Figure 1:
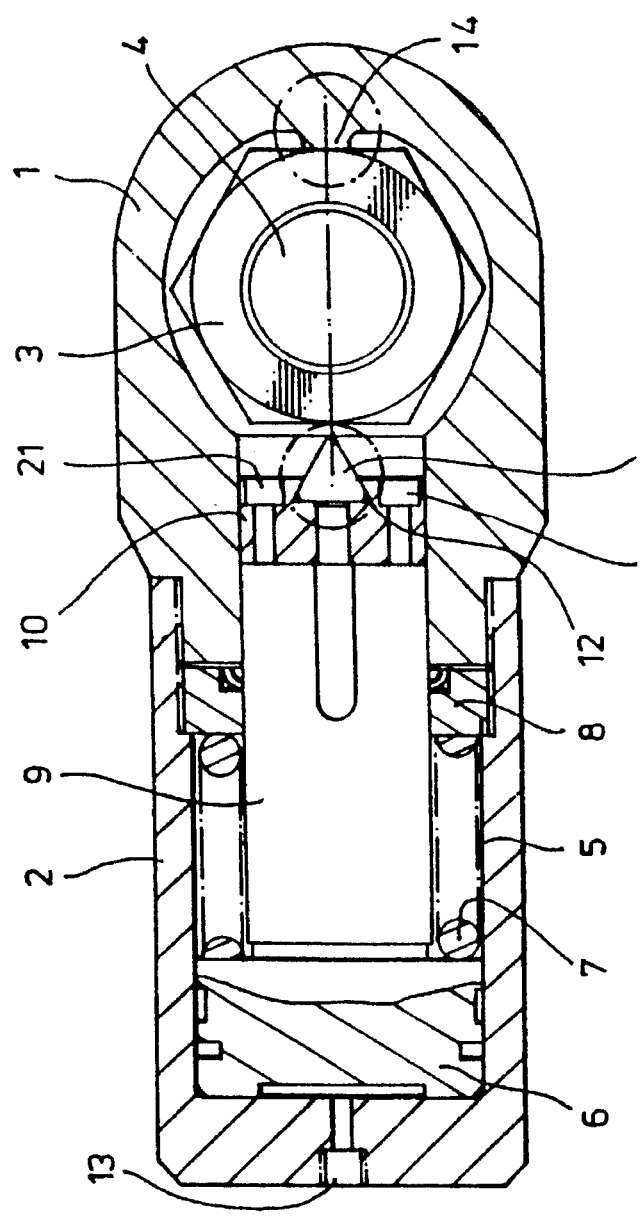
FIG. 1 is a plan view partly in section of a nut splitter according to the invention.
Figure 3:
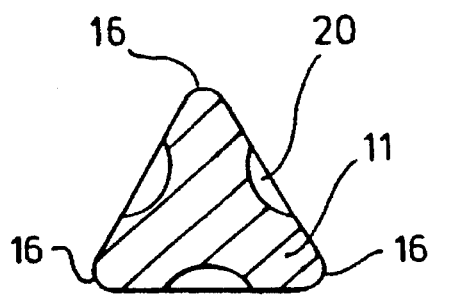
FIG. 3 is a cross-sectional end view of the blade of FIG. 2 on line X—X thereof.
Figure 4:
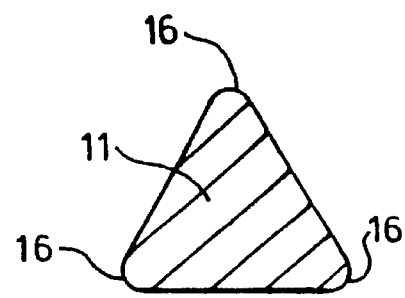
FIG. 4 is a further cross-sectional end view of the blade of FIG. 2, but on line Y—Y thereof.

Referring firstly to FIG. 1, the nut splitter comprises a nut-encircling frame is 1 located at one end of a tubular extension 2. The frame shown mounted around a nut 3 on a bolt 4. The extension 2 comprises a hydraulic cylinder 5 and a piston 6, together with a disengagement spring 7, the latter serving to bias the piston away from the nut 3. An internal collar 8 serves as a sleeve bearing for a piston rod 9 which carries at its free end a cutting blade holder 10 attached by set screws 21. A blade 11 is shown seated in a recess 12 in the holder 10, the latter being best seen in FIGS. 5 and 6. The blade itself is best seen in FIGS. 2–4.

The cylinder 5 has an oil inlet port 13 for the admission of hydraulic oil.

In operation, the piston and cylinder device is energised via port 13, to drive the blade 11 to engage the nut 3, trapping it firmly between the blade 11 and a blunt abutment convexly rounded or flattened as shown at 14 on the inside of the frame 1 and located diametrically opposite to the blade 11. The latter is progressively driven into the nut 3 causing it to split apart along the diameter just mentioned.

Figure 2:
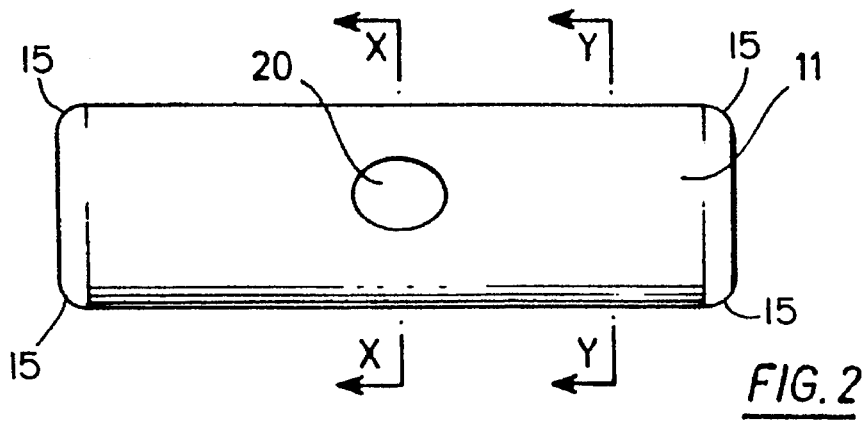
FIG. 2 is a side elevation of a cutting blade for use in the nut splitter of FIG. 1.

FIG. 2 shows the blade 11 of FIG. 1 in side elevation with its distal corners 15 all rounded, to a radius of 2.0 mm.

In FIG. 3, the section on X—X shows the blade corners 16 rounded to a radius of 1.5–1.8 mm and in both FIG. 2 and FIG. 3 ball detent recesses 20 are shown roughly intermediate the ends of the blade 11.

FIG. 4 corresponds to FIG. 3, but shows the blade cross-section without the ball detent recesses 20.

Figure 5:
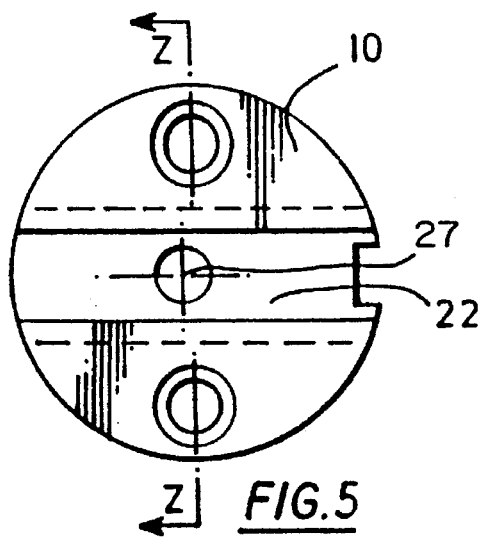
FIG. 5 is a plan view of a blade holder for the nut splitter of FIG. 1.
Figure 6:
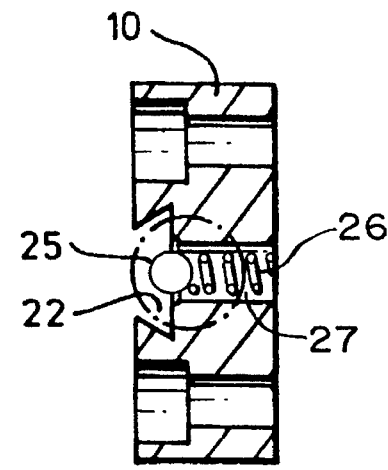
FIG. 6 is a cross-sectional side view of the tool holder of FIG. 5, on line Z—Z thereof but with a spring loaded ball located with the holder.

Referring now to FIGS. 5 and 6, the blade holder 10 is circular in plan and drilled for the mounting screws 21, (shown in FIG. 1 only). The face of the holder contains a dovetail recess 22 into which the base of the triangular blade slides until a spring loaded ball 25 engages in one of the detent recesses 20. Ball 25 and associated spring 26 are movable within the bore 27 provided in the holder 10. It will be apparent that with a blade of the preferred form, changing the working/cutting edge is a matter of pressing out the blade, turning through 120° and then replacing it in the recess 22 to present one of the previous base edges as the cutting edge.

I claim:

1. A nut splitter comprising a nut-encircling frame, a blade supported by, and displaceable relative to, said frame together with means for effecting said relative movement in a direction to split a nut within said frame, wherein the cutting edge of said blade is formed with a blunt convexly, rounded cross-section at said edge.

2. A nut splitter according to claim 1 wherein the blade is triangular with an included angle at the cutting edge of from 40°–60°.

3. A nut splitter according to claim 1 wherein said blunt, rounded cross-section has a radius of from 0.5 to 2.5 mm.

4. A nut splitter according to claim 1 wherein said cutting edge extends between distal lateral ends of said blade, and further wherein said distal ends of the cutting edge are rounded.

5. A nut splitter according to claim 1 wherein the blade is an equilateral triangle in cross-section with three cutting edges formed respectively at the apices of the triangle.

6. A nut splitter according to claim 5 further comprising a blade holder adapted to removably receive the blade so as to present a selected edge as the cutting edge.

7. A nut splitter according to claim 6 wherein the blade holder includes means for retaining the blade.

8. A nut splitter according to claim 7 wherein said means is a spring loaded ball.

\* \* \* \* \*